(12) United States Patent
Kraft et al.

(10) Patent No.: US 10,677,162 B2
(45) Date of Patent: *Jun. 9, 2020

(54) GRID SCALE ENERGY STORAGE SYSTEMS USING REHEATED AIR TURBINE OR GAS TURBINE EXPANDERS

(71) Applicant: POWERPHASE LLC, Jupiter, FL (US)

(72) Inventors: Robert J. Kraft, Tequesta, FL (US); Matthew Kraft, Jupiter, FL (US)

(73) Assignee: POWERPHASE LLC, Jupiter, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/887,569

(22) Filed: Feb. 2, 2018

(65) Prior Publication Data

US 2018/0156111 A1 Jun. 7, 2018

Related U.S. Application Data

(62) Division of application No. 14/855,963, filed on Sep. 16, 2015, now Pat. No. 10,364,743.

(60) Provisional application No. 62/055,247, filed on Sep. 25, 2014.

(51) Int. Cl.
*F02C 6/16* (2006.01)
*F02C 1/10* (2006.01)

(52) U.S. Cl.
CPC ............... *F02C 6/16* (2013.01); *F02C 1/105* (2013.01); *Y02E 60/15* (2013.01)

(58) Field of Classification Search
CPC ............. F02C 1/105; F02C 6/16; Y02E 60/15
See application file for complete search history.

(56) References Cited

U.S. PATENT DOCUMENTS

| | | | | |
|---|---|---|---|---|
| 3,939,356 A * | 2/1976 | Loane | ....................... | F02C 6/16 290/52 |
| 4,281,256 A * | 7/1981 | Ahrens | ..................... | F02C 6/16 290/1 R |
| 4,312,179 A * | 1/1982 | Zaugg | ....................... | F02C 6/16 60/774 |
| 4,355,508 A * | 10/1982 | Blenke | ..................... | B60K 6/12 180/165 |
| 4,885,912 A * | 12/1989 | Nakhamkin | .............. | F02C 1/06 60/652 |
| 5,537,822 A * | 7/1996 | Shnaid | ...................... | F02C 6/04 60/650 |
| 7,614,237 B2 * | 11/2009 | Nakhamkin | ............ | F01D 15/10 60/39.183 |
| 7,661,268 B2 * | 2/2010 | Althaus | ................... | F01K 23/10 60/39.182 |
| 2009/0199998 A1 | 8/2009 | Shimozono | | |
| 2010/0288571 A1 * | 11/2010 | Dewis | ...................... | B60K 3/04 180/165 |
| 2011/0094212 A1 * | 4/2011 | Ast | ........................... | F02C 1/02 60/327 |
| 2011/0094236 A1 * | 4/2011 | Finkenrath | ............... | F02C 6/16 60/772 |

(Continued)

*Primary Examiner* — Matthew T Largi
(74) *Attorney, Agent, or Firm* — Lathrop GPM LLP; Hissan Anis

(57) ABSTRACT

Electrical power systems, including generating capacity of a gas turbine, where additional power is generated from an air expander and gas turbine simultaneously from a stored compressed air and thermal system.

14 Claims, 4 Drawing Sheets

(56) References Cited

U.S. PATENT DOCUMENTS

2014/0096523 A1\* 4/2014 Coney ................... F01K 23/10
                                                                        60/650

\* cited by examiner

GRID SCALE ENERGY STORAGE SYSTEMS USING REHEATED AIR TURBINE OR GAS TURBINE EXPANDERS

CROSS-REFERENCE TO RELATED APPLICATIONS

This application is a division of U.S. patent application Ser. No. 14/855,963, filed Sep. 16, 2015, which claims priority to U.S. Provisional Patent Application Ser. No. 62/055,247, filed Sep. 25, 2014, the entire contents of which are hereby incorporated herein by reference.

TECHNICAL FIELD

The invention relates generally to electrical power systems and energy storage systems, including generating capacity of a gas turbine, independent air turbines and more specifically to methods of integrating compressed air energy storage and stored heat energy.

BACKGROUND OF THE INVENTION

As the renewable energy market increases there is a dynamic balancing act that takes place every day between load, renewable power and conventional generation. For example, in the California energy market, solar energy use is significantly changing the dispatch of conventional generation. During the middle of the day, when load peaks, solar power is also at its peak and thus suppresses the traditional generation required during this peak load period. Consequently, there is a need to shift the power output from conventional generation to the morning and evening time, and reduce power, or shut off, during the middle of the day. Today, there is no energy storage system available that can shift the power output of conventional generation.

In California, thermal storage using inlet chilling has been one method of shifting the power of gas turbine generation, however, there are significant drawbacks to this chilling system. The first drawback is with respect to the charging time of a thermal storage system, which can take approximately 15-18 hours, and therefore can only discharge once per day. This can be overcome with larger chilling systems, however, such systems add considerable expense. The second drawback is that chillers work on the principal of cooling the inlet temperature of the gas turbine with a lower temperature limit of about 55 F, and, unfortunately, the peak power output is required typically between 5 am and 9 am and then again between 6 pm and 10 pm, which are out of phase with the hot part of the day.

SUMMARY

The present invention provides a system which can charge and discharge multiple times each day, and therefore is able to capture both energy peaks and troughs on any given day. The present invention is a direct injection air system and avoids the majority of the issues with ambient temperature, and therefore has the capacity to generate power from the gas turbine during the morning and evening peak usage periods. In addition, the present invention has two modes of discharging that can be used independently or together, which allows the energy storage system to discharge power to the grid even if the gas turbine is not running.

The present invention is a modular system capable of working at a gas turbine power plant and adds approximately 10 Megawatts (MW) of energy storage per module and returns 10-20 MW of energy to the grid during peak periods when the gas turbine is running and 5 MW to the grid when the gas turbine plant is not running.

The present invention discloses systems and methods of operation for compressing an ambient air supply, storing the compressed air, heating air taken from the air storage and directing the heated air through an air turbine and/or a gas turbine engine for power generation.

Additional advantages and features of the present invention will be set forth in part in a description which follows, and will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

The present invention relates to methods and systems of compressing air, storing the air, and discharging the air through an air turbine, a gas turbine, or both to improve operations at a power plant.

Figure 1:
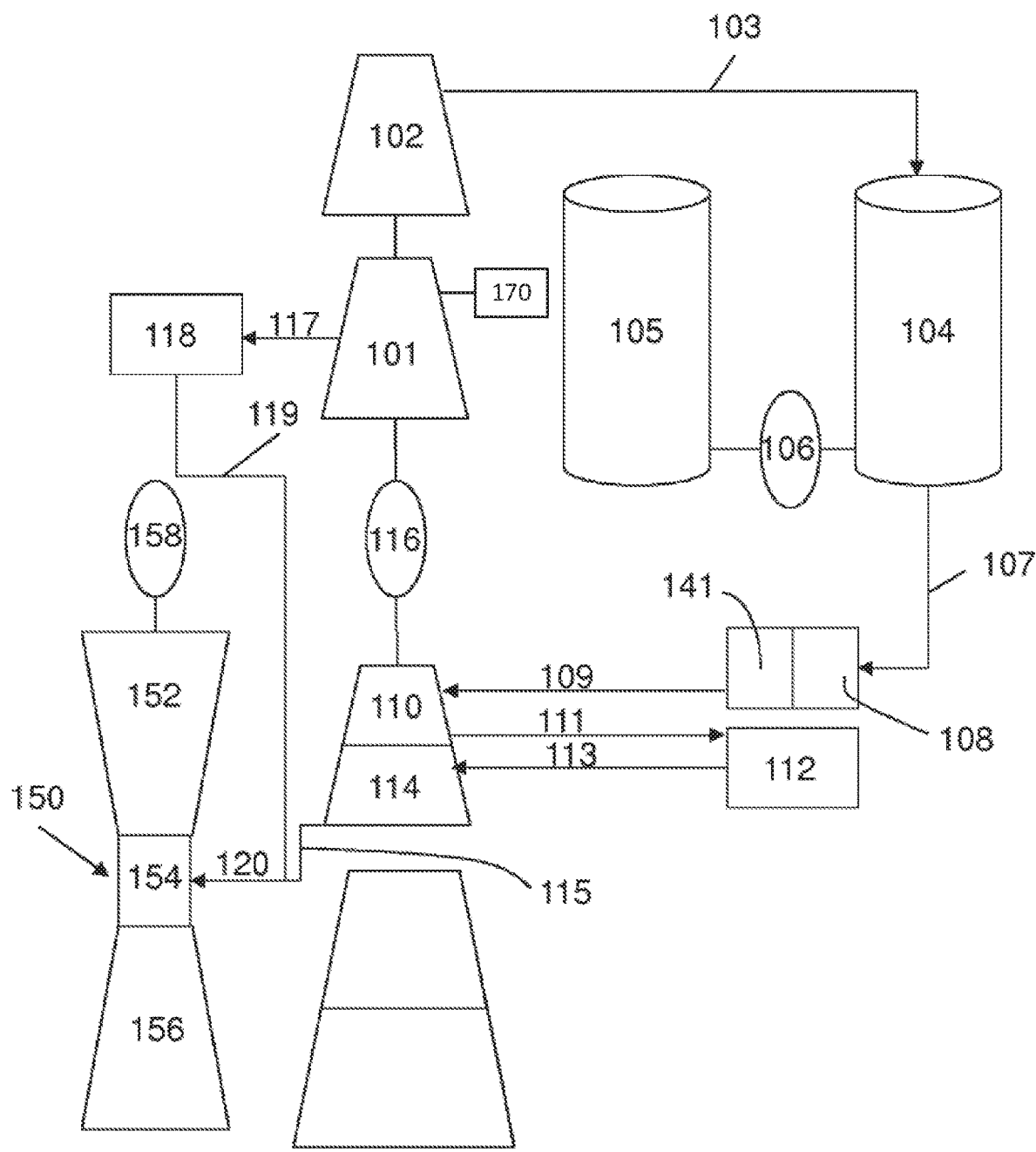
FIG. 1 is a schematic drawing of an embodiment of the present invention with a discharge of compressed air to an operating gas turbine engine.

Referring initially to FIG. 1, an embodiment of the present invention compresses ambient air through a multi-stage compressor. The compressor comprises two separate pieces of equipment, a low pressure compressor (LPC) 101 and a high pressure compressor (HPC) 102. Both the LPC 101 and HPC 102 are driven by the same motor/shaft system and can be de-coupled from one another via a clutch (not shown), allowing the LPC 101 to be driven separately from the HPC 102. Alternatively, the LPC 101 and HPC 102 can be driven with two different electric motors. Further, the multi-stage compressor can be an intercooled compressor where intercooling occurs after each stage of compression. For example, in an embodiment of the present invention, the LPC 101 comprises four stages with corresponding intercoolers 170 between each stage of the compressor. Utilizing intercoolers 170 reduces the amount of work the compressor needs to supply, thus increasing compressor efficiency and reducing energy consumed in the compression process. The intercoolers 170 are supplied with cooling water, either integrated with a power plant cooling system or from a water tank 105. The water tank 105 can act as a large thermal sink for the compression process and can be used in a closed loop manner.

In an embodiment of the present invention, the LPC 101 takes in ambient air and compresses it to approximately 236 psi, at a flow rate of approximately 15 lbm/s. In this embodiment, the LPC 101 is running at 50% flow capacity and consumes approximately 2.27 MW of electrical power during this process. The HPC 102 takes the air from the LPC 101 and compresses it further to approximately 1556 psi, at the same 15 lbm/s flow rate. The HPC 102 consumes about 1.52 MW of electrical power during this process. The combined electrical power consumption of the LPC and HPC totals approximately 3.8 MW. The 3.8 MW can be supplied to the LPC 101 and HPC 102 individually with two separate electric motors or with a single motor and a common shaft. Separate motors may be preferred over a common shaft in order to decouple the systems which can allow for certain operational flexibility.

During the "energy storage mode", the compressed air passes from the HPC 102 to the air storage tank 104 through an air delivery pipe 103. The compression process takes approximately four hours to fill the air storage tank 104 consuming approximately 14.4 MW-hrs of energy in the process. This compression/storage process usually occurs during off peak hours or when electrical power demand is low. This allows the power provider to consume energy at a lower cost, or when it would have been otherwise wasted or unused.

During the "air injection mode" of the unit in FIG. 1, instead of storing the air, it is injected into the gas turbine engine 150. Here, the LPC 101 operates at full flow and generates 32 lb/sec at approximately 160 psi discharge pressure. This compressed air bypasses the intercoolers 170 and HPC 102 and is directed towards the gas turbine engine 150. The gas turbine engine 150 is generally made up of a compressor 152, a compressor discharge plenum 154 upstream of the combustion system (not shown), a turbine 156 and a generator 158. The air from LPC 101 is slightly elevated in pressure compared to the compressor discharge pressure found in the compressor discharge plenum 154 of the gas turbine 150. Before reaching the gas turbine 150, the air is heated in a heater 118 to a temperature approximately equivalent to the compressor discharge temperature of the gas turbine engine 150. For example, for a D-class gas turbine, the compressor discharge temperature is approximately 600 degrees Fahrenheit having a safe injection temperature is approximately 500-600 deg. F. A heater 118 capable of heating the air is a graphite based heater that stores electrical energy in the form of heat in the graphite during the storage process and then is used to heat the air to approximately 400 deg. F. during the discharge process. Alternatively, the heater can be a salt-based storage system. As one skilled in the art can appreciate, a valve system including a bypass system, is required to maintain a constant temperature output of approximately 400 deg. F. as the graphite thermal block cools off.

Figure 3:
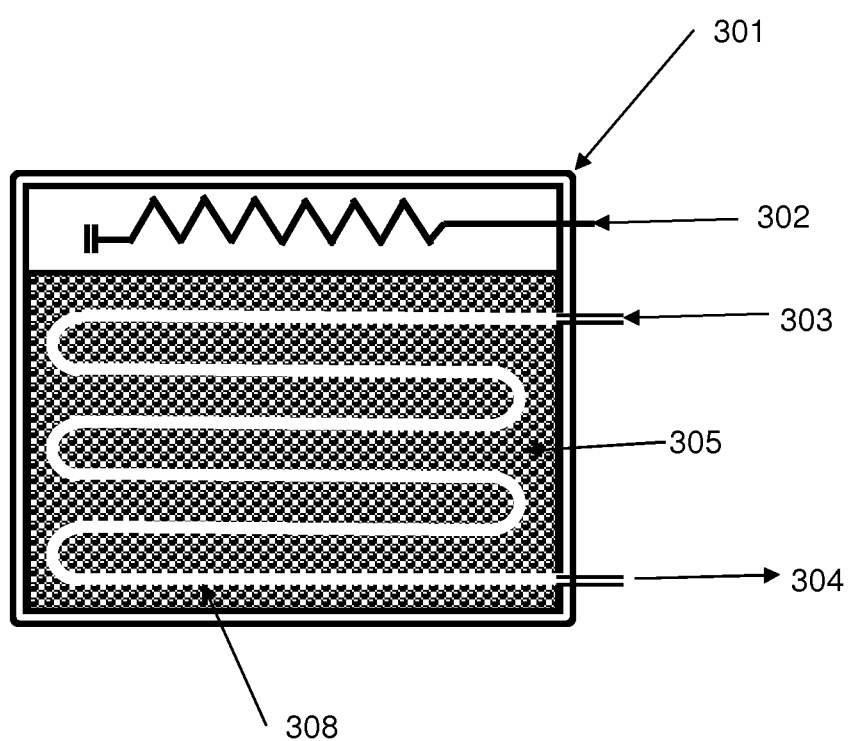
FIG. 3 depicts a thermal storage medium component in accordance with an embodiment of the present invention.

Heated air is then injected into the compressor discharge plenum 154. Heaters used throughout the present invention may be as discussed above in heater 118. Alternatively, heaters can be as disclosed in FIGS. 3 and 4. More specifically, with reference to FIG. 3, a container 301 is insulated and partially filled with a thermal storage medium 305, which has favorable properties to hold heat once it is hot and favorable properties of transferring heat to a steel air pipe 308. The thermal storage medium 305 can be liquid or solid. Inside the insulated container 301 is an electric resistive heater 302 which takes electricity in and resistively heats the thermal storage medium 305. If the thermal storage medium 305 is liquid, then the air pipe 308 is submersed in the liquid. Otherwise, if the thermal storage medium 305 is solid, then the air pipe 308 is in very close proximity to the thermal storage medium 305. The air pipe 308 has an inlet end 303 where cool pressurized air enters the heater and an exit end 304 where hot pressurized air exits the heater. During the storage process, electricity is introduced to the resistive heater 302, thereby heating the resistive element. During the discharge cycle, the cool air is introduced to the heater 302 and it is heated as it travels through the air pipe 308, exiting the heater at an elevated temperature and pressurized for the expansion process or for injection into the gas turbine.

Figure 4:
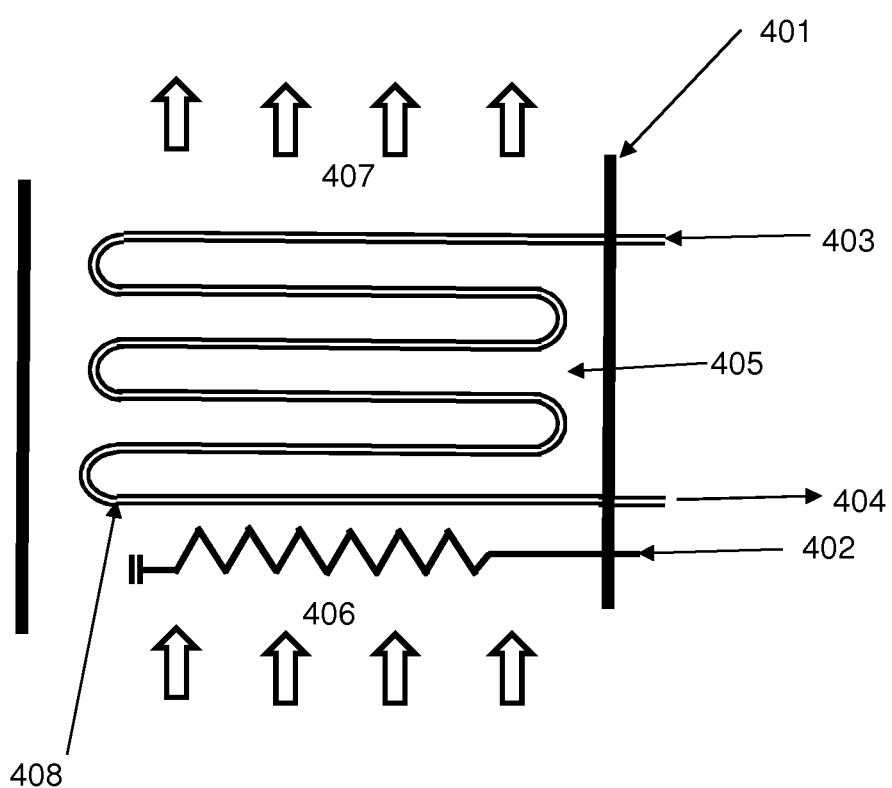
FIG. 4 depicts a fueled air heater for use with an embodiment of the present invention.

Alternatively, FIG. 4 depicts a fueled air heater as a source of heating the air. A duct 401 has an inlet end 406 where air, indicated by arrows, or exhaust gasses from the gas turbine enters the duct. Inside the duct 401, a gas heater 402 introduces heat to the air or exhaust gas producing hot gas inside the duct 401. The hot gasses pass over the air pipe 408 and the pressurized air that enters the duct 401 at inlet 403 is heated and exits as hot pressurized air at outlet 404. The remaining hot gasses exit at the duct outlet 407. If the gasses entering the duct 401 are hot enough for the process, then the gas heater may not be necessary and can be omitted. In this configuration, the duct 401 is commonly referred to as a recuperator. The gasses entering the duct may be coming from the gas turbine, but may not be as hot as desired, in this case, heat may be added to the exhaust gasses by firing the exhaust gasses. Alternately, exhaust gasses may not be available, therefore, air would enter the duct 401 and be fired to the desired temperature to heat up the air.

Referring back to FIG. 2, an alternate embodiment of the present invention is depicted. In this embodiment, the air turbine receiving heated air comprises four stages (110, 114, 210, and 214). All four stages of the air turbine are connected through the same drive system, which in turn is linked to a generator 116. Air is provided from the air storage tank 104 and as air is expanded through each stage of the turbine, it drops in temperature and pressure. The High Pressure Expander HPE, or turbine, is made up of the first stage expander 110 and a second stage expander 114. The Low Pressure Expander (LPE) is made up of a third stage expander 210 and a fourth stage air expander 214. Adding heat to the air before it enters each stage of the turbine increases the output capacity of the respective expander stage.

In an embodiment of the present invention, air leaving the storage tank 104 is at 15 lbm/s and approximately 1556 psi and ambient temperature. The air first passes through a pre-heater 222 with the heat source for the pre-heater 222 being the exhaust of the last stage of the air expander 214, via air pipe 125. This thermal exchange in the pre-heater 222 increases the temperature from ambient, to 550 deg. F. The pre-heater 222 is a key element of the power output of the reheated air expander. Typically when air is expanded through a multistage expander, the temperature drops through each stage and exits to ambient cooler. In this reheat expander, more power is extracted for the same mass flow rate because it is reheated and then the heat that is left over and exiting the last stage expander is used in the cycle to preheat the air exiting the air tank 104 in order to maximize energy usage. Next, the pre-heated pressurized air passes through a first heater 108. As discussed above, various heaters can be used for heating the air. One such first heater 108 is the electrical energy that is stored in a graphite or salt-based thermal block. Upon exiting the first heater 108, the pressurized air is approximately 1050 F and is sent to through a pipe 109 to an air expander 110 where the air expands, extracting 1.12 MW of energy from the fluid. After the expansion process in the first stage 110, the air is at a lower pressure and temperature, approximately 703 psi and 747 deg. F. The air is then sent through an air pipe 111 to a second heater 241. The air then passes through the second heater 241, which is charged with electrical energy in the form of heat, raising the temperature of the air to approximately 1065 deg. F., and is sent through an air pipe 113 to be expanded through the second stage of the expander 114. The second stage expander 114 extracts approximately 1.24 MW of energy. The air is discharged from the second stage expander 114 at approximately 266 psi and 730 deg. F., and is sent to a third heater 243, through an air pipe 242. In the third heater 243, the temperature and pressure are raised to approximately 1063 deg. F. and 266 psi, respectively. The air is sent through an air pipe 244 and is expanded through the third stage of the air expander 210, where it extracts 1.34 MW of energy. After the third stage expander 210, the air is again at a lower pressure and temperature, approximately 96 psi and 699 deg. F., respectively. The air is then sent through an air pipe 246 to a fourth heater 245. The air then passes through the fourth heater 245, where the temperature is raised to approximately 1060 F, and is sent through an air pipe 247 to the fourth stage air expander 214, where the air is expanded extracting 1.48 MW of energy. This now low pressure "warm" air is then sent through an air pipe 125 to the pre-heater 222 where it is used to pre-heat the air leaving the air storage tank 104, as described above. The total power extracted by all four stages of the expander is approximately 5.18 MW. As one skilled in the art can appreciate, there is a cost benefit to the thermal storage and therefore, it may be more economical to only reheat a portion of the air with a heater instead of all of the stages of the expander. At a tank discharge flow rate of 15 lbm/s and a given tank size of 30,000 cubic feet, the turbine expansion process extracts power for about four hours. This gives a total of 20.4 MW-hrs of energy produced in the motor-generator 116.

In order for the above mentioned air expander cycle to operate as described, all of the air in the tank needs to discharge at approximately 1556 psi. Previous compressed air energy storage (CAES) technology would allow the air tank to drop in pressure from about 1556 psi to about 800 psi, or until the air turbine does not function as intended. This leaves an enormous amount of unutilized air left in the tank. The present invention takes advantage of all of the air in the storage tank 104, which in turn decreases the volume of air storage required, as well as decreasing cost. The air tank 104 is backfilled with a corrosion inhibiting incompressible fluid such as treated water. As air is sent to the expander, a high pressure pump 106 backfills the air tank 104 with water from water tank 105, which replaces the missing air and keeps the operating pressure of the air tank 104 at approximately 1556 psi. The pump 106 requires a 0.6 MW parasitic load to continuously discharge the air from the tank 104 at 1556 psi.

Referring back to FIG. 1, in an alternate embodiment of the present invention, stored compressed air from the air storage tank 104 can be utilized with stored heat energy to generate additional power. High pressure air is released from the tank 104 at ambient temperature and enters a first heater 108 and a second heater 141, which are the same heaters discussed above with respect to the air expander only cycle. In this discharge mode, the first heater 108 preheats the air before it enters the second heater 141. The air is discharged from the second heater at approximately 1050 deg. F. and 1559 psi through air pipe 109 and enters the first stage air expander 110 where approximately 1.12 MW is extracted and the air is discharged at approximately 703 psi. The air leaves the first stage expander 110 through air pipe 111 where it enters a third heater 112 which heats the air to approximately 1065 F. The air is then sent to the second stage air expander 114 via air pipe 113, where approximately 1.24 MW is extracted and the air is discharged at approximately 266 psi to the gas turbine compressor discharge plenum 154. Note, in this embodiment of the present invention, the exhaust of the air expander is not from the last stage of the air expander, but an intermediate stage prior to the last stage. The last two air expander stages are clutched out so they are not spinning and do not contribute to this cycle. The first two air expander stages produce approximately 2.36 MW which is transmitted through the shaft that connects the air expander, motor generator 116 and compressors 101/102 together. An additional 2.27 MW is added in the form of electrical power by the motor-generator 116, which is parasitic load during the power generation mode. The HPC 102, which is used in the air storage process, is clutched out during this operation and does not contribute to this power generation cycle in this example. Optionally, the first and second stage expanders can drive a generator and the power generated can be supplied to the grid or used to drive the electric motor driven compressor. However, where air injection into gas turbines with higher compressor discharge pressures, such as the LM6000 having a 550 psi compressor discharge pressure, the high pressure compressor may be engaged to elevate the pressure for injection into the gas turbine which will be described below. The air exiting the low pressure air compressor 101 through conduit 117 is at a temperature of approximately 240 F and 266 psi and enters a fourth heater 118 which is electrically charged with heat. The air temperature rises to approximately 400 F and leaves the fourth heater 118 through air pipe 119. The air pipes 119 and 115, are joined together in an air pipe 120 and inject air into the gas turbine compressor discharge plenum 154. As described herein, for a D-class simple cycle gas turbine engine, the air produces approximately 13.4 MW. On an F-class combined cycle gas turbine, this same air would produce about 22 MW. Both the electrical load supplied to the motor-generator (2.27 MW) and the power consumed by the water pump (0.6 MW) are netted from the power the gas turbine engine is generating and produce a net gain of approximately 10.5 MW for the D-class gas turbine engine. The compressor, air expander, motor generator, water tank and heaters are used in both the charging and discharging mode and therefore contribute significantly to minimizing the overall cost of the system.

As one skilled in the art can appreciate, the ability to discharge air into a gas turbine engine is somewhat limited by the ambient temperature, and therefore during cold ambient temperatures, the air discharged to the gas turbine may be limited. In this case, instead of all of the air going through the gas turbine as outlined above, a portion of the air can go through the gas turbine while the balance of the air is discharged to the third and fourth stages of the air expanders 210 and 214, respectively. Also, the example given above is designed for a combined cycle power plant where waste heat is not available. In the event the energy storage system is located at a simple cycle gas turbine, some or all of the first, second, third and fourth heaters can be replaced by recuperators to minimize or eliminated the electrical energy required in heat storage process. As one skilled in the art can also appreciate, it might be desirable to have both electrically charged heaters as well as recuperators at a simple cycle gas turbine plant. In the event the gas turbine is not running, the electric heaters can be used or when the gas turbine is running, the gas turbine waste heat can be used via the recuperators. To improve the electrical output of the air expander as well as the injection temperature into the gas turbine, which further increases the efficiency of the gas turbine, the air can be passed through the recuperator and then the electrically charged heaters. In the preceding description of an embodiment of the present invention, it is intended that the electrically charged heaters are the same heaters in both the air expander only discharge mode and the gas turbine discharge mode (or a hybrid of both). At plants with waste heat, such as simple cycle peaking plants, recuperators or electrically charged heaters are required, or as described above, both can be used simultaneously.

Figure 2:
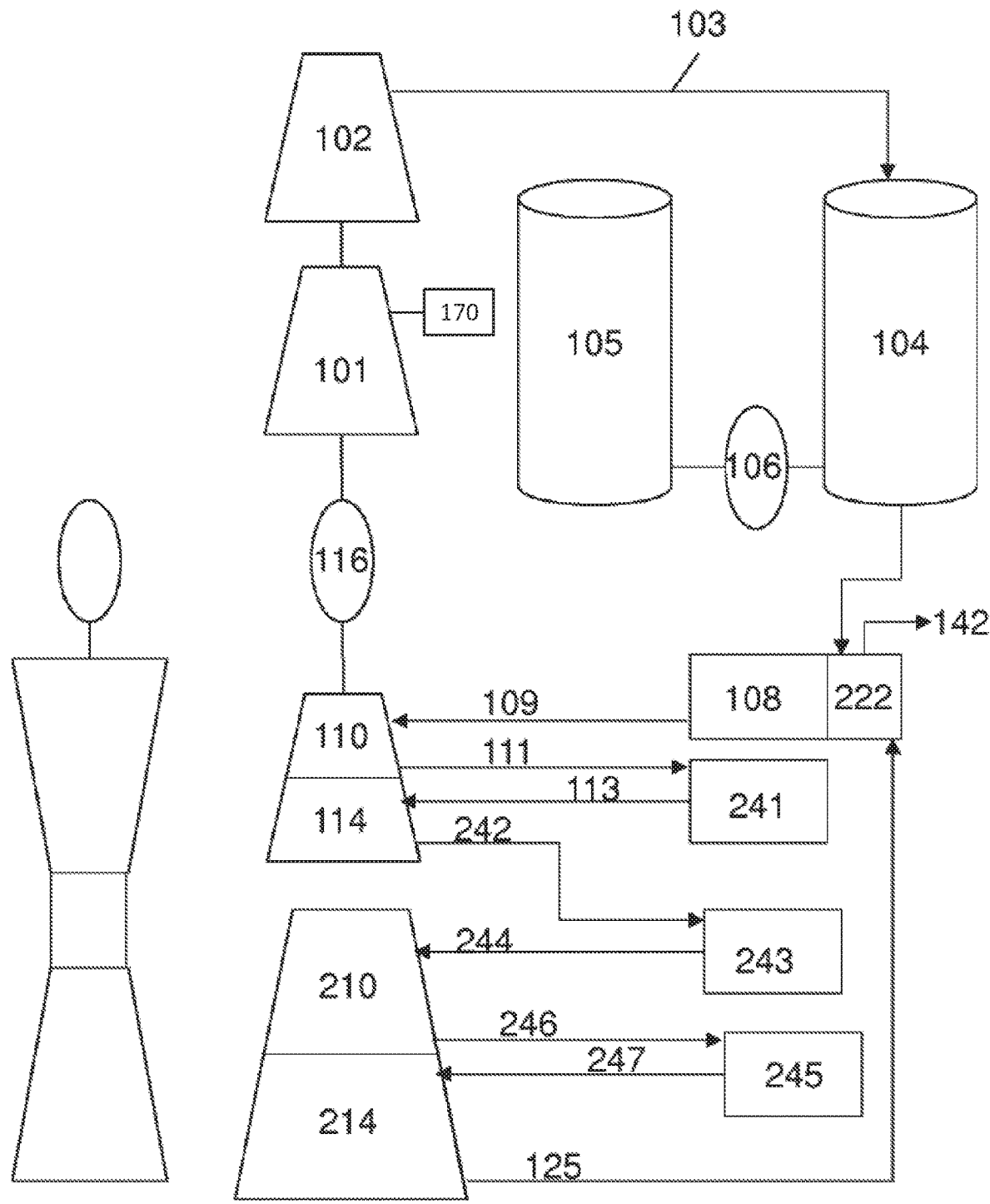
FIG. 2 is a schematic drawing of an alternate embodiment of the present invention where compressed air is discharged from an air storage to an air turbine.

Another aspect of the current invention is depicted in FIG. 2. The resultant discharge temperature of the air expander to atmosphere 142, is similar to the ambient air temperature in the beginning of the process, thus not exhausting hot gases to the atmosphere. With some minor modifications, the cycle disclosed herein could be closed where the exit of the air expander could be the inlet of the air compressor and the system could also run in real time and not require any storage tanks. This closed loop system, assuming the heat input was from a waste source or thermal storage, would consume approximately 3.8 MW in the compression process and generate approximately 5.2 MW, or a net power output of about 1.4 MW. For this reason, it would be advantageous to drive the LPC and HPC with an electric motor and have the stages of expanders drive a generator. In this example, if waste heat is available, as in a simple cycle gas turbine, the process could run indefinitely. In this configuration, other gasses could be used besides air since the system is a closed loop, enhancing the power output of the system. If thermal stored heat is the heat source, then approximately 5.6 MW of heat would have to be stored and the output would be about 1.4 MW, or a return of 25% of the stored energy. Again, this return percentage could be significantly improved if other gasses with higher enthalpy changes for the same temperature drop were used.

While the invention has been described in what is known as presently the preferred embodiment, it is to be understood that the invention is not to be limited to the disclosed embodiment but, on the contrary, is intended to cover various modifications and equivalent arrangements within the scope of the following claims. The present invention has been described in relation to particular embodiments, which are intended in all respects to be illustrative rather than restrictive.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

The invention claimed is:

1. A method of operating a compressed aft energy storage system associated with a gas turbine power plant, the compressed aft energy storage system having an aft storage tank in fluid communication with a multi-stage compressor, the multi-stage compressor comprising a low pressure compressor having an intercooler associated therewith and a high pressure compressor, the method comprising:
operating the compressed aft energy storage system in an energy storage mode by:
compressing ambient air in the low pressure compressor, cooling the compressed aft using the intercooler, and then compressing the compressed aft in the high pressure compressor to generate a first compressed air flow; and
directing the first compressed air flow from the high-pressure compressor to the air storage tank;
operating the compressed aft energy storage system in an aft injection mode by:
compressing ambient aft in the low pressure compressor to generate a second compressed air flow and heating the second compressed air flow in a heater such that the second compressed air flow bypasses each of the intercooler and the high pressure compressor;
directing the first compressed air flow from the air storage tank-through each of a first heater and an expander to generate a first air flow; and,
injecting into a compressor discharge plenum of a gas turbine engine of the gas turbine power plant: (a) the first aft flow; and (b) the heated second compressed aft flow;
wherein:
a pressure of the second compressed aft flow exiting the low pressure compressor is greater than a pressure of air in the compressor discharge plenum;
a temperature of the heated second compressed air flow is approximately equal to a temperature of air in the compressor discharge plenum; and
an operating pressure of the air storage tank is maintained using a corrosion inhibiting incompressible fluid.

2. The method of claim 1, wherein the corrosion inhibiting incompressible fluid is treated water.

3. The method of claim 2, further comprising providing a preheater upstream of the first heater.

4. The method of claim 2, wherein the expander is a multi-stage expander.

5. The method of claim 4, further comprising providing a heater between each stage of the multi-stage expander.

6. The method of claim 1, further comprising mixing the first air flow and the heated second compressed air flow prior to injection.

7. The method of claim 1, further comprising coupling each of the gas turbine engine and the expander to a separate generator.

8. A method of operating a compressed air energy storage system associated with a gas turbine power plant, the compressed aft energy storage system having an air storage tank in fluid communication with a multi-stage compressor, the multi-stage compressor comprising a low pressure compressor having an interceder associated therewith and a high pressure compressor, the method comprising:
operating the compressed air energy storage system in an energy storage mode by:
compressing ambient air in the low pressure compressor, cooling the compressed aft using the intercooler, and then compressing the compressed air in the high pressure compressor to generate a first compressed aft flow; and
directing the first compressed aft flow from the high-pressure compressor to the air storage tank;
operating the compressed aft energy storage system in an aft injection mode by:
compressing ambient air in the low pressure compressor to generate a second compressed aft flow and heating the second compressed aft flow in a heater such that the second compressed aft flow bypasses each of the intercooler and the high pressure compressor;
directing the first compressed aft flow from the air storage tank through each of a first heater and an expander to generate a first aft flow; and, injecting into a compressor discharge plenum of a gas turbine engine of the gas turbine power plant: (a) the first air flow; and (b) the heated second compressed aft flow;

wherein:

a pressure of the second compressed aft flow exiting the low pressure compressor is greater than a pressure of aft in the compressor discharge plenum; and a temperature of the heated second compressed air flow is approximately equal to a temperature of air in the compressor discharge plenum.

9. The method of claim 8, further comprising providing a preheater upstream of the first heater.

10. The method of claim 9, wherein the expander is a multi-stage expander.

11. The method of claim 10, further comprising providing a heater between each stage of the multi-stage expander.

12. The method of claim 11, further comprising mixing the first air flow and the heated second compressed air flow prior to injection.

13. The method of claim 11, further comprising coupling each of the gas turbine engine and the expander to a separate generator.

14. A method of operating a compressed air energy storage system associated with a gas turbine power plant, the compressed aft energy storage system having an air storage tank in fluid communication with a multi-stage compressor, the multi-stage compressor comprising a low pressure compressor having an intercooler associated therewith and a high pressure compressor, the method comprising:

operating the compressed air energy storage system in an energy storage mode by:

compressing aft in the low pressure compressor, cooling the compressed aft using the intercooler, and then compressing the compressed air in the high pressure compressor to generate a first compressed aft flow; and directing the first compressed aft flow from the high-pressure compressor to the aft storage tank;

operating the compressed air energy storage system in an air injection mode by:

compressing aft in the low pressure compressor to generate a second compressed air flow, the second compressed air flow bypassing each of the interceder and the high pressure compressor;

directing the first compressed air flow from the air storage tank through each of a first heater and an expander to generate a first air flow; and, injecting into a compressor discharge plenum of a gas turbine engine of the gas turbine power plant at least one of: (a) the first aft flow; and (b) the second compressed air flow;

wherein:

a pressure of the second compressed aft flow exiting the low pressure compressor is greater than a pressure of air in the compressor discharge plenum.

* * * * *